United States Patent [19]

Szostak

[11] Patent Number: 4,585,639

[45] Date of Patent: Apr. 29, 1986

[54] PREPARATION OF CRYSTALLINE SILICATE ZSM-12

[75] Inventor: Rosemarie Szostak, Cumming, Ga.

[73] Assignee: Mobil Oil Corporation, New York, N.Y.

[21] Appl. No.: 684,181

[22] Filed: Dec. 20, 1984

Related U.S. Application Data

[63] Continuation of Ser. No. 600,687, Apr. 16, 1984, abandoned.

[51] Int. Cl.$^4$ .......................... C01B 33/28; B01J 29/06
[52] U.S. Cl. .................................. 423/328; 423/329; 502/62; 502/77
[58] Field of Search .............................. 423/326–332; 502/62, 77

[56] References Cited

U.S. PATENT DOCUMENTS

| | | | |
|---|---|---|---|
| 3,832,449 | 8/1974 | Rosinski et al. | 423/328 |
| 4,061,717 | 12/1977 | Kerr et al. | 423/329 |
| 4,151,189 | 4/1979 | Rubin et al. | 260/448 |
| 4,296,083 | 10/1981 | Rollmann | 423/329 |
| 4,391,785 | 7/1983 | Rosinski et al. | 423/329 |
| 4,427,787 | 1/1984 | Miale et al. | 502/71 |
| 4,452,769 | 6/1984 | Chu | 423/329 |

FOREIGN PATENT DOCUMENTS

| | | | |
|---|---|---|---|
| 0042226 | 12/1981 | European Pat. Off. | 423/326 |
| 2077709 | 12/1981 | United Kingdom | 423/328 |

*Primary Examiner*—Edward J. Meros
*Attorney, Agent, or Firm*—Alexander J. McKillop; Michael G. Gilman; Dennis P. Santini

[57] ABSTRACT

This invention relates to a new and improved form of crystalline silicate ZSM-12, to a new and useful improvement in synthesizing said crystalline silicate and to use of said crystalline silicate prepared in accordance herewith as a catalyst for organic compound, e.g. hydrocarbon compound, conversion.

13 Claims, No Drawings

PREPARATION OF CRYSTALLINE SILICATE ZSM-12

This is a continuation of copending application Ser. No. 600,687, filed Apr. 16, 1984, now abandoned.

BACKGROUND OF THE INVENTION

1. Field of the Invention

This invention relates to a new and improved form of crystalline silicate ZSM-12, to a new and useful improvement in synthesizing crystalline silicate ZSM-12 and to use of the crystalline silicate ZSM-12 prepared in accordance herewith as a catalyst for organic compound, e.g. hydrocarbon compound, conversion.

More particularly, this invention relates to an improved method of preparing crystalline silicate ZSM-12 whereby synthesis is facilitated and the zeolite product exhibits enhanced purity and catalytic activity when compared to conventionally synthesized ZSM-12.

2. Discussion of Prior Art

Crystalline silicate ZSM-12 and its conventional preparation are taught by U.S. Pat. No. 3,832,449, the entire disclosure of which is incorporated herein by reference. It has a distinctive X-ray diffraction pattern which identifies it from other known crystalline silicates.

U.S. Pat. No. 4,391,785 teaches a method for synthesis of zeolite ZSM-12 from a reaction mixture comprising, as a directing agent, a compound selected from the group consisting of dimethyl pyridinium halide and dimethyl pyrrolidinium halide. U.S. Pat. No. 4,296,083 claims synthesizing zeolites characterized by a constraint index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,112,056 teaches a synthesis method for ZSM-12 from a reaction mixture containing tetraethylammonium ions as directions agent. U.S. Pat. No. 4,452,769 claims a method for synthesizing ZSM-12 from a reaction mixture containing methyltriethylammonium ions as the directing agent.

Applicant knows of no prior art methods for preparing crystalline silicate ZSM-12 utilizing the present improved method.

SUMMARY OF THE INVENTION

An improved method for preparing an improved crystalline silicate ZSM-12 exhibiting enhanced purity and other properties is provided which comprises forming a reaction mixture containing sources of an alkali metal oxide, an organic nitrogen-containing cation, an oxide of aluminum, an oxide of silicon and water and having a composition, in terms of mole ratios, within the following ranges:

|  | Broad | Preferred |
| --- | --- | --- |
| $SiO_2/Al_2O_3$ | 40 to 200 | 60 to 200 |
| $H_2O/SiO_2$ | 5 to 200 | 20 to 100 |
| $OH^-/SiO_2$ | 0.01 to 1.0 | 0.1 to 0.5 |
| $M/SiO_2$ | 0.01 to 2.0 | 0.1 to 1.0 |
| $R/SiO_2$ | 0.05 to 1.0 | 0.1 to 0.5 | wherein R is a cation derived from a linear diquaternary ammonium compound and M is an alkali metal ion, and maintaining the mixture until crystals of the crystalline silicate are formed. The quantity of $OH^-$ is calculated only from the inorganic sources of alkali without any organic base contribution. Thereafter, the crystals are separated from the liquid and recovered. Reaction conditions required consist of heating the foregoing reaction mixture to a temperature of from about 80° C. to about 200° C. until crystals of the ZSM-12 are formed, usually from about 12 hours to about 30 days. A more preferred temperature range is from about 100° C. to about 180° C. with the amount of time at a temperature in such range being from about 24 hours to about 7 days.

The digestion of the gel particles is carried out until crystals form. The solid product is separated from the reaction medium, as by cooling the whole to room temperature, filtering and water washing.

EMBODIMENTS

ZSM-12 synthesized under conventional procedure is proven to exhibit catalytic activity for certain chemical conversions of interest. When the crystalline silicate ZSM-12 is synthesized in accordance with the present method, it exhibits greater purity along with catalytic activity for those certain conversions of interest, including xylene isomerization and benzene alkylation, while maintaining para-selectivity, and conversion of methanol and dimethylether to hydrocarbons, e.g. olefins. Further, the prior conventional reaction mixture for preparation of crystalline silicate ZSM-12, e.g. requiring an organic directing agent described as a tetraalkylammonium compound such as tetraethylammonium or methyltriethylammonium compounds, allows for product contamination with other silicates. The present method produces relatively pure ZSM-12 free from other silicate contaminants. It is noted, however, that the reaction mixture $SiO_2/Al_2O_3$ mole ratio in the present method is critical, since at greater than 200, a different crystalline silicate tends to form in place of the ZSM-12.

It is also noted that the present method is significantly more cost advantageous in synthesis of ZSM-12 than the prior art methods, since no aging of the gel is required during synthesis in order to obtain the relatively pure ZSM-12 product. Also, the linear diquaternary ammonium compound directing agent for use herein may be, if desired, generated in situ using tetramethylalkane-diamine and ethyl halide reactants.

The particular effectiveness of the presently required different organic directing agent, i.e. the linear diquaternary ammonium compound, hereafter more particularly described, when compared with other directing agents, such as, for example, tetraethylammonium and methyltriethylammonium compounds, is believed due to its ability to function as a template in the nucleation and growth of ZSM-12 crystals.

The reaction mixture composition for the synthesis of synthetic crystalline silicate ZSM-12 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-12 can be supplied by one or more essential reactants and they can be mixed together in any order. For example, any oxide can be supplied by an aqueous solution, sodium hydroxide or by an aqueous solution of a suitable silicate; the organic cation can be supplied by the directing agent compound of that cation, such as, for example, the hydroxide or a salt. The reaction mixture can be prepared either batchwise or continuously. Crystal size and crystallization time of the ZSM-12 composition will vary with the exact nature of the reaction mixture employed.

The organic directing agent required of the present method is a linear diquaternary ammonium compound expressed by the formula:

$$X(C_2H_5)(CH_3)_2N(CH_2)_mN(CH_3)_2(C_2H_5)X$$

wherein X is an anion, e.g. halide (such as fluoride, chloride, bromide, iodide), hydroxide, acetate, sulfate, carboxylate, etc.; and m is the number 4 or 6 or cycloheteroalkyl of from 3 to 6 carbon atoms.

Non-limiting examples of such liner diquaternary compounds include:

$$Cl(C_2H_5)(CH_3)_2N(CH_2)_4N(CH_3)_2(C_2H_5)Cl,$$
$$I(C_2H_5)(CH_3)_2N(CH_2)_4N(CH_3)_2(C_2H_5)I,$$
$$HO(C_2H_5)(CH_3)_2N(CH_2)_4N(CH_3)_2(C_2H_5)OH,$$
$$Br(C_2H_5)(CH_3)_2N(CH_2)_6N(CH_3)_2(C_2H_5)Br,$$
$$Cl(C_2H_5)(CH_3)_2N(CH_2)_6N(CH_3)_2(C_2H_5)Cl,$$
$$I(C_2H_5)(CH_3)_2N(CH_2)_6N(CH_3)_2(C_2H_5)I,$$
and
$$HO(C_2H_5)(CH_3)_2N(CH_2)_6N(CH_3)_2(C_2H_5)OH.$$

Particularly preferred diquaternary compounds have X being halide, e.g. chloride, bromide or iodide, or hydroxide, and N being quadricoordinate nitrogen.

The ZSM-12 composition as prepared hereby has a characteristic X-ray diffraction pattern in the calcined, sodium-exchanged form, the values of which are set forth in Table 1, hereinafter. The ZSM-12 composition as prepared hereby can also be identified, in terms of mole ratios of oxides and in the anhydrous state, as follows:

$$(1 \text{ to } 6)R_2O:(0.1 \text{ to } 1)M_{2/n}O:(0.5 \text{ to } 2)Al_2O_3:(100)SiO_2$$

wherein M is at least one cation having a valence n and R is a cation derived from a linear diquaternary ammonium compound, above described.

TABLE 1

| Interplanar d-Spacing (A) | Relative Intensity (I/I$_o$) |
|---|---|
| 11.9 ± 0.2 | M |
| 10.1 ± 0.2 | M |
| 4.76 ± 0.1 | W |
| 4.29 ± 0.08 | VS |
| 3.98 ± 0.08 | M |
| 3.87 ± 0.07 | VS |
| 3.49 ± 0.07 | W |
| 3.38 ± 0.07 | M |
| 3.20 ± 0.06 | W |
| 3.05 ± 0.05 | W |
| 2.54 ± 0.03 | W |

These values were determined by standard technique. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, 100 I/I$_o$ where I$_o$ is the intensity of the strongest line or peak, and d (obs.), the interplanar spacing in Angstrom units (A) corresponding to the recorded lines, were calculated. In Table 1 the relative intensities are given in terms of the symbols W=weak, VS=very strong and M=medium. Ion exchange of the sodium ions with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The original cations, e.g. alkali metal, can be replaced, at least in part, by calcination and/or ion exchange with another cation. Thus, the original cations are exchanged into a hydrogen or hydrogen ion precursor form or a form in which the original cation has been replaced by a metal of Groups IIA, IIIA, IVA, IB, IIB, IIIB, IVB, VIB or VIII of the Periodic Table. Thus, for example, it is contemplated to exchange the original cations, e.g. alkali metal, with ammonium ions or with hydronium ions. Catalytically active forms of these would include, in particular, hydrogen, rare earth metals, aluminum, metals of Groups II and VIII of the Periodic Table and manganese.

While the improved crystalline silicate ZSM-12 may be used in a wide variety of organic compound, e.g. hydrocarbon compound, conversion reactions, it is notably useful in the processes of cracking, hydrocracking and reforming. Other conversion processes for which improved ZSM-12 may be utilized in one or more of its active forms include, for example, isomerization, transalkylation, dealkylation, and alkylation.

Synthetic ZSM-12 prepared in accordance herewith can be used either in the organic nitrogen-containing and alkali metal contaning form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-12 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

Synthetic ZSM-12, when employed either as an adsorbent or as a catalyst in a hydrocarbon conversion process, should be dehydrated at least partially. This can be done by heating to a temperature in the range of from about 200° C. to about 600° C. in an inert atmosphere, such as air, nitrogen, etc. and at atmospheric or subatmospheric pressures for between 1 and 48 hours. Dehydration can also be performed at lower temperature merely by placing the catalyst in a vacuum, but a longer time is required to obtain a particular degree of dehydration. The thermal decomposition product of the new ZSM-12 can be obtained by heating same to about 500° C. for from about 1 hour to about 48 hours.

As above mentioned, synthetic ZSM-12 prepared in accordance herewith can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange technique would be to contact the synthetic ZSM-12 with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

Regardless of the cation replacing the alkali metal in the synthesized form of the ZSM-12, the spatial arrangement of the aluminum, silicon and oxygen atoms which form the basic crystal lattices of ZSM-12 remains essentially unchanged by the described replacement of alkali metal as determined by taking an X-ray powder diffraction pattern of the ion-exchanged material.

The crystalline silicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the ZSM-12 hereby prepared with another material resistant to the temperatures and other conditions employed in organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous parecipitates, sols or gels including mixtures of silica and metal oxides. Use of a material in conjunction with the ZSM-12, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subject to rough handling, which tends to break the catalyst down into powder-like materials which cause problems in processing.

Naturally occurring clays which can be composited with the hereby synthesized ZSM-12 include the montmorillonite and kaolin families which include the sub-bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the ZSM-12 catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate ZSM-12 and inorganic oxide gel matrix vary widely with the crystalline silicate content ranging from about 1 to about 90 percent by weight, and more usually in the range of about 2 to about 50 percent by weight of the composite.

Employing a catalytically active form of the composition of this invention containing a hydrogenation component, reforming stocks can be reformed employing a temperature between 370° C. and 540° C. The pressure can be between 100 and 1000 psig, but is preferably between 200 and 700 psig. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins, when provided with a hydrogenation component, e.g. platinum. Hydroisomerization is carried out at a temperature between 90° C. to 370° C., preferably 140° C. to 290° C., with a liquid hourly space velocity between 0.01 and 2, preferably between 0.25 and 0.50, employing hydrogen such that the hydrogen to hydrocarbon mole ratio is between 1 and 5. Additionally, the catalyst can be used for olefin or aromatics isomerization employing temperatures between 0° C. and 370° C.

The catalyst can also be used for reducing the pour point of gas oils. This process is carried out at a liquid hourly space velocity between about 10 and about 30 and a temperature between about 400° C. and about 540° C.

Other rections which can be accomplished employing the catalyst of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented.

EXAMPLE 1

A reaction mixture was prepared by adding an aqueous solution composed of 84.5 grams water, 1.6 grams aluminum sulfate and 2.3 grams sulfuric acid to a solution comprising 50 grams water, 50 grams sodium silicate (Q-Brand, 28.5 weight percent SiO$_2$, 8.8 weight percent Na$_2$O and 62.7 weight percent H$_2$O), and 11 grams of directing agent I(C$_2$H$_5$)(CH$_3$)$_2$N(CH$_2$)$_6$N(CH$_3$)$_2$(C$_2$H$_5$)I. The reaction mixture had a composition, in mole ratios, as follows:

SiO$_2$/Al$_2$O$_3$ 90
H$_2$O/SiO$_2$ 40
OH$^-$/SiO$_2$ 0.30
Na$^+$/SiO$_2$ 0.59
R/SiO$_2$ 0.10 wherein R is (C$_2$H$_5$)(CH$_3$)$_2$N$^+$(CH$_2$)$_6$N$^+$(CH$_3$)$_2$(C$_2$H$_5$).

The mixture was heated and stirred in an autoclave at 160° C. for 72 hours. The resulting mixture was cooled to room temperature and filtered, yielding solid crystalline product. The solid product was analyzed by X-ray diffraction, which indicated that it was 90% crystalline ZSM-12, free from other zeolite contaminants.

Chemical analysis of the solid product of this example indicated the following components:

Carbon 5.97 wt.%
Nitrogen 0.73 wt.%
Sodium 2.88 wt.%
Silicon 35.98 wt.%
Aluminum 1.02 wt.%
Ash 84.60 wt.%

The molar compositional formula of the solid product expressed as oxides based on one mole of Al$_2$O$_3$ is:

1.38N$_2$O:3.31Na$_2$O:1Al$_2$O$_3$:68SiO$_2$

EXAMPLE 2

The procedure of Example 1 is repeated, except that the directing agent is identified by the formula:

HO(C$_2$H$_5$)(CH$_3$)$_2$N(CH$_2$)$_4$N(CH$_3$)(C$_2$H$_5$)OH.

X-ray analysis of the product from this Example indicates it to be zeolite ZSM-12, free from other zeolite contaminants.

What is claimed is:

1. A method for synthesizing a crystalline silicate ZSM-12 exhibiting a characteristic X-ray diffraction pattern as shown in Table 1 of the specification, which comprises (i) preparing a mixture capable of forming said crystalline silicate, said mixture comprising sources of alkali metal cations, an oxide of aluminum, an oxide of silicon, water and diquaternary cations of the formula (C$_2$H$_5$)(CH$_3$)$_2$N$^+$(CH$_2$)$_m$N$^+$(CH$_3$)$_2$(C$_2$H$_5$), wherein m is 4 or 6, and having a composition, in terms of mole ratios, within the following ranges:

SiO$_2$/Al$_2$O$_3$ 40 to 200
H$_2$O/SiO$_2$ 5 to 200
OH$^-$/SiO$_2$ 0.01 to 1.0
M/SiO$_2$ 0.01 to 2.0
R/SiO$_2$ 0.05 to 1.0 wherein M is said alkali metal cation and R is said diquaternary cation, (ii) maintaining the mixture at a temperature of from about 80° C. to about 200° C. until crystals of the crystalline silicate are formed and (iii) recovering the crystalline silicate ZSM-12 from step (ii), said recovered crystalline silicate containing alkali metal and said diquaternary cations.

2. The method of claim 1 wherein said mixture has a composition, in terms of mole ratios, as follows:

SiO$_2$/Al$_2$O$_3$=60 to 200
H$_2$O/SiO$_2$=20 to 100
OH$^-$/SiO$_2$=0.1 to 0.5
M/SiO$_2$=0.1 to 1.0
R/SiO$_2$=0.1 to 0.5.

3. The method of claim 1 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

4. The method of claim 2 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

5. The method of claim 3 wherein said replacing cation is hydrogen or a hydrogen precursor.

6. The method of claim 4 wherein said replacing cation is hydrogen or a hydrogen precursor.

7. The recovered crystalline silicate ZSM-12 product of claim 1.

8. The recovered crystalline silicate ZSM-12 product of claim 2.

9. The diquaternary cation-containing crystalline silicate ZSM-12 product of claim 3.

10. The diquaternary cation-containing crystalline silicate ZSM-12 product of claim 4.

11. The diquaternary cation-containing crystalline silicate ZSM-12 product of claim 5.

12. The diquaternary cation-containing crystalline silicate ZSM-12 product of claim 6.

13. Diquaternary cation-containing silicate ZSM-12, said diquaternary cation having the formula (C$_2$H$_5$)(CH$_3$)$_2$N$^+$(CH$_2$)$_m$N$^+$(CH$_3$)$_2$(C$_2$H$_5$), m being 4 or 6.

* * * * *